United States Patent [19]

Mannen et al.

[11] Patent Number: 5,385,045
[45] Date of Patent: Jan. 31, 1995

[54] TIRE CHANGING AND BALANCING MACHINE

[75] Inventors: Bryce L. Mannen; Steve Rogers, both of Conway, Ark.

[73] Assignee: FMC Corporation, Chicago, Ill.

[21] Appl. No.: 914,362

[22] Filed: Jul. 15, 1992

[51] Int. Cl.$^6$ ............................................. G01M 1/22
[52] U.S. Cl. ........................................ 73/462; 73/487
[58] Field of Search ................. 73/462, 460, 480, 487

[56] References Cited

U.S. PATENT DOCUMENTS

| | | |
|---|---|---|
| 4,352,291 | 10/1982 | Curchod et al. .................. 73/462 |
| 4,480,471 | 11/1984 | Kogler et al. .................... 73/462 |
| 4,507,964 | 4/1985 | Borner et al. . | 
| 5,172,596 | 12/1992 | Rothamel et al. ............... 73/462 |

FOREIGN PATENT DOCUMENTS 2536857 6/1984 France .
3143577 9/1982 Germany .

*Primary Examiner*—Herbert Goldstein
*Assistant Examiner*—Joseph L. Felber
*Attorney, Agent, or Firm*—Michael Lee; R. C. Kamp

[57] ABSTRACT

The invention provides a tire changing and balancing machine. On the same shaft used to mount and demount a tire, a wheel assembly is balanced. A tire on a wheel assembly is placed between a breaker blade and a breaker pad. The breaker blade collapses the tire. The wheel assembly is then mounted on a shaft. A mounting and demounting head is used to remove the tire from the wheel assembly. A new tire is placed on the wheel assembly. The mounting and demounting head is then used to mount the new tire on the wheel assembly. The wheel assembly and mounted tire are then spun on the shaft and balanced.

9 Claims, 3 Drawing Sheets

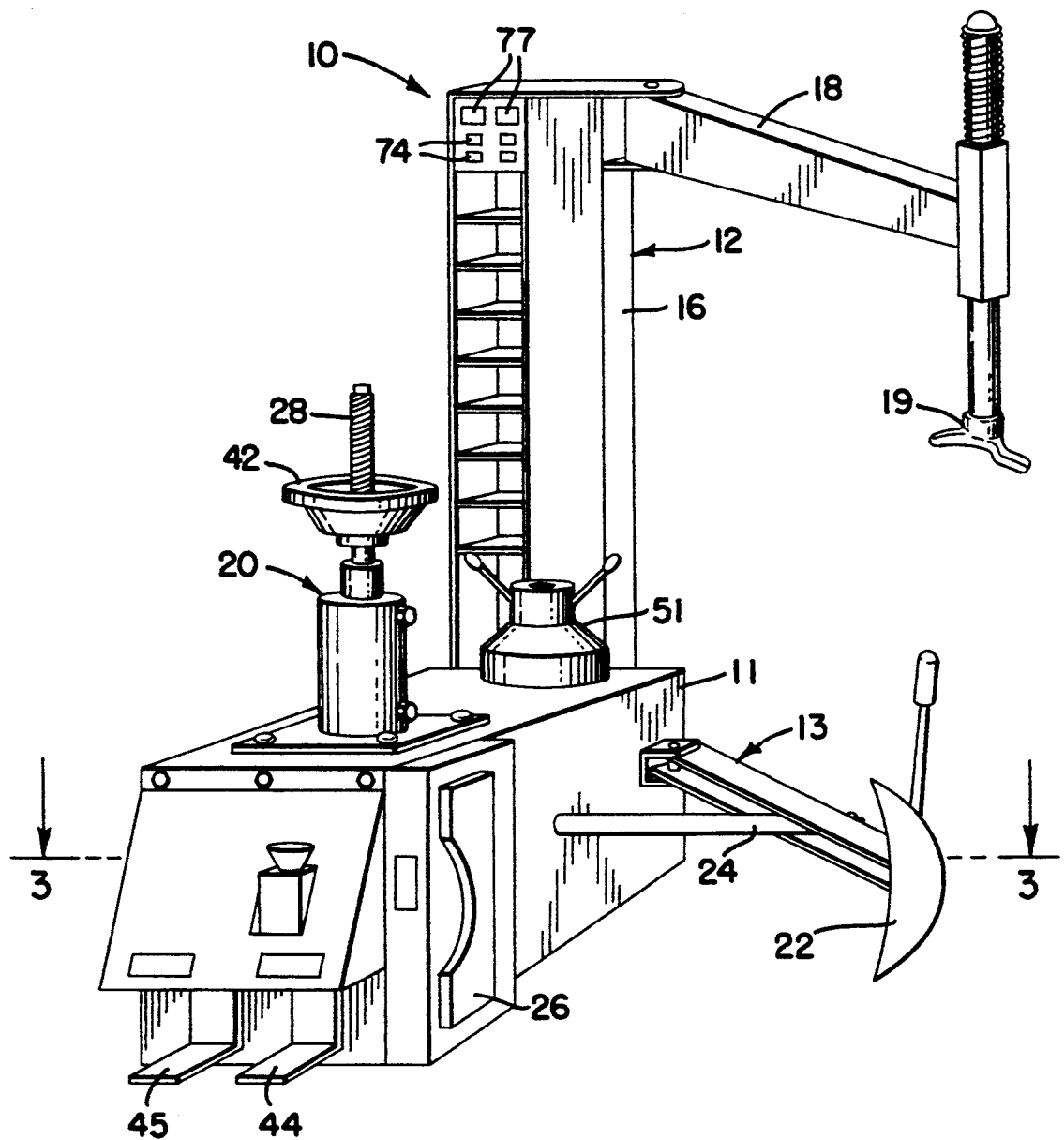

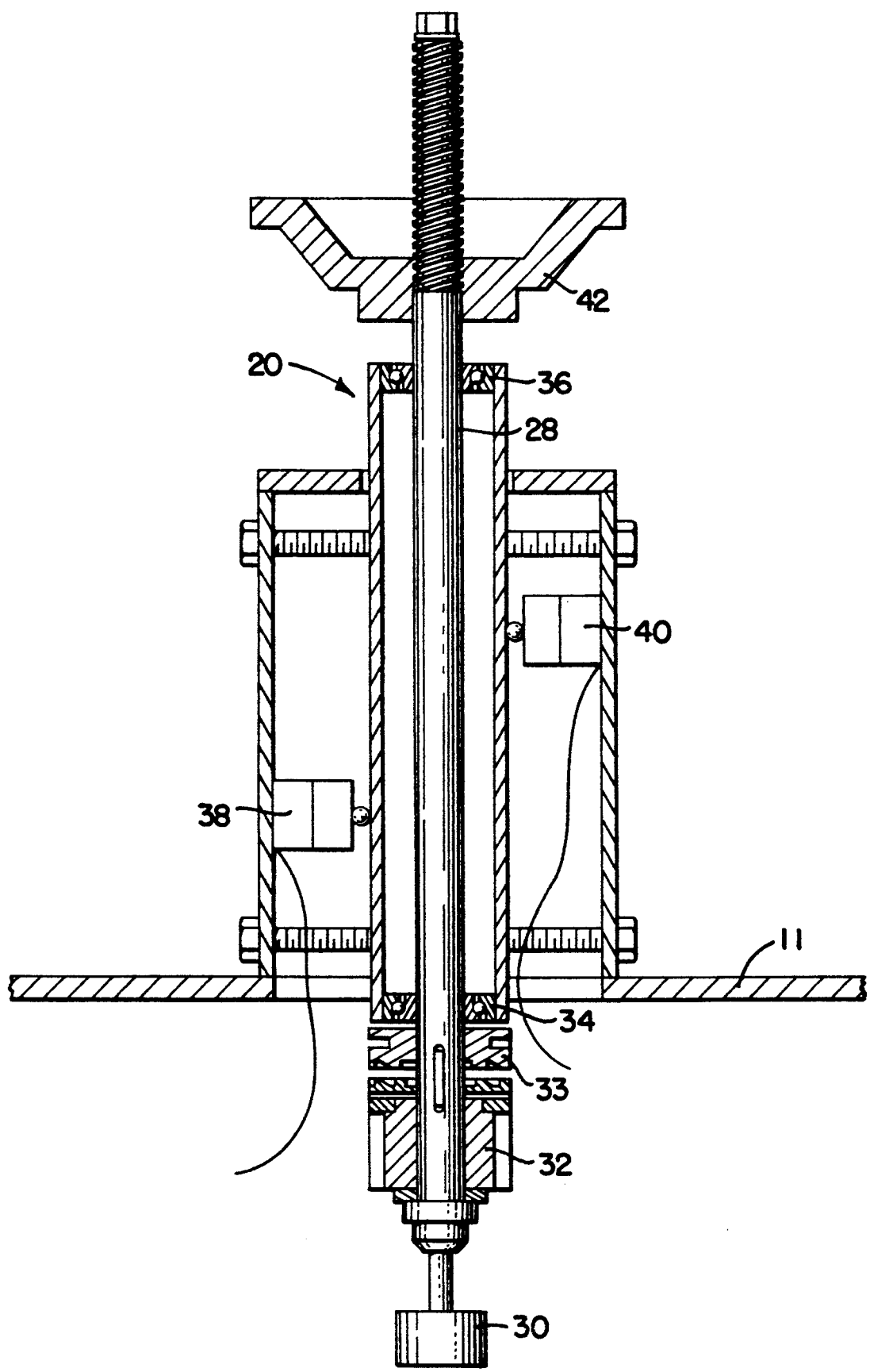
FIG_2

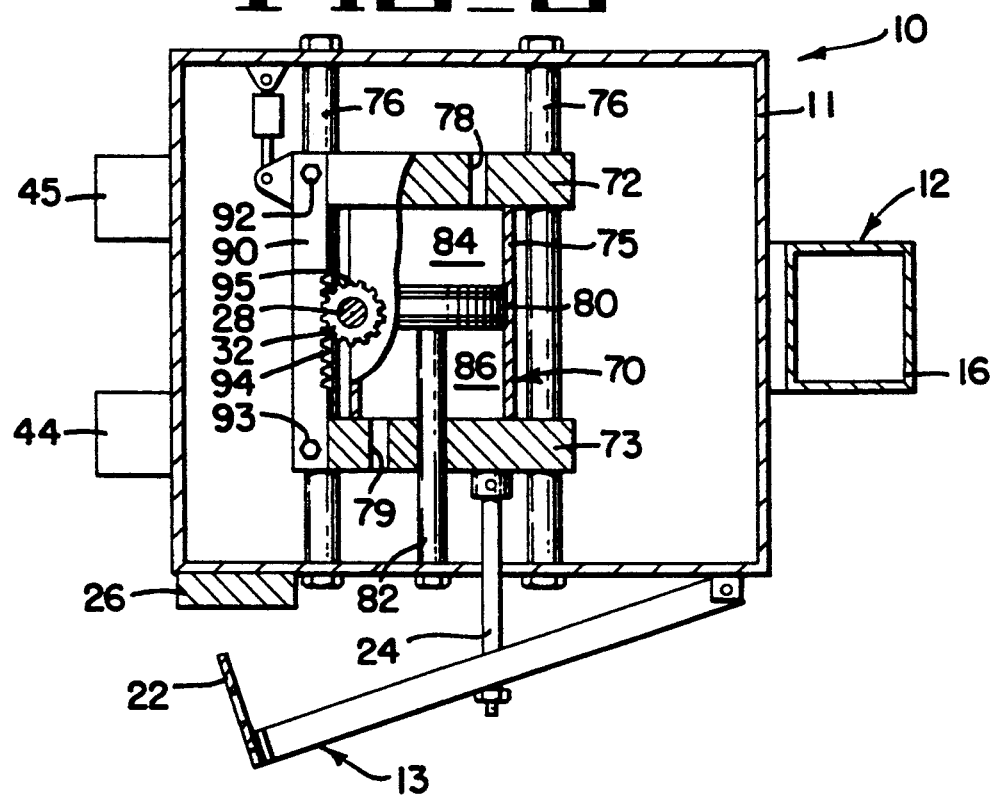
FIG_3
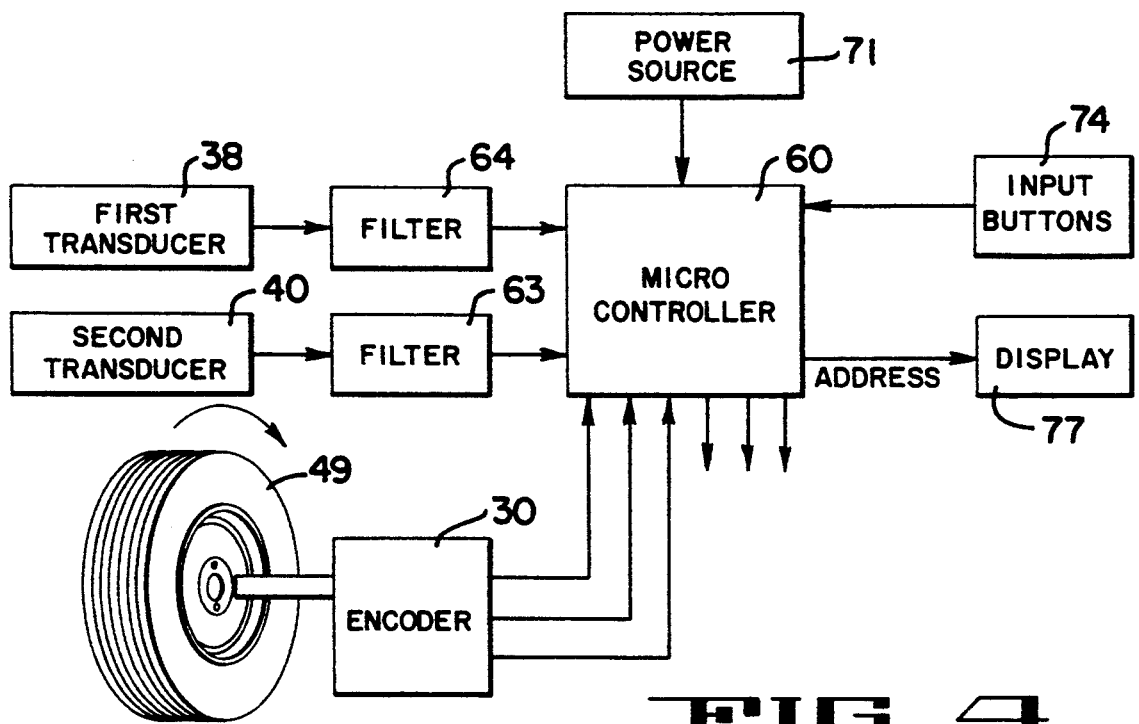
FIG_4

TIRE CHANGING AND BALANCING MACHINE

In the prior art one machine was used for tire changing and another was used for tire balancing. One problem with having separate machines is that they use more space. Another problem is that setting up the tire on two separate machines takes more time then setting up the tire once on a single machine. It is desirable to combine a tire changing machine with a tire balancing machine in a manner that provides a compact machine where the tire changing function does not interfere with the tire balancing function.

The invention provides a single machine for changing and balancing tires.

FIGS. 1 is a perspective view of a preferred embodiment of the invention which is used for changing and balancing tires.

FIG. 2 is a central cross-section of a shaft assembly used in the embodiment illustrated in FIG. 1.

FIG. 3 is a horizontal cross-section of the embodiment illustrated, taken along lines 3—3 of FIG. 1.

FIG. 4 is a schematic diagram of the electronic system used in the embodiment illustrated in FIG. 1.

FIG. 1 is a perspective view of a tire changing and balancing machine 10. The tire changing and balancing machine 10 comprises a base cabinet 11, a tower assembly 12, a bead breaker arm 13, and a shaft assembly 20.

The tower assembly 12 comprises, a tower 16 where tower 16 has a first end connected to the base cabinet 11 and a second end away from the base cabinet 11, a mount and demount arm 18 with a first end connected by a hinge to the second end of the tower 16, a vertical mount and demount head 19 is connected to a second end of the mount and demount arm 18.

The bead breaker arm 13 has a first end connected by a hinge to the base cabinet 11 and a second end attached to a breaker blade 22. In this embodiment, a first end of a draw bar 24 is attached near the center of the bead breaker arm 13 by a hinge. A second end of the draw bar 24 is attached to a means for applying a tension or compression force on the draw bar 24 such as a pneumatic drive using a rack and pinion inside the base cabinet 11. A breaker pad 26 is placed on the side of the base cabinet 11 where the breaker blade 22 would approach the base cabinet 11. The breaker arm 13, breaker blade 22, and breaker pad 26 provide a means for collapsing a tire. Other embodiments may use other means for collapsing a tire.

FIG. 2 is a cross-sectional view of a shaft assembly 20. The shaft assembly 20 comprises a shaft 28, a shaft encoder 30 on a first end of the shaft 28, a pinion gear 32 through which the shaft 28 passes, a clutch plate 33 through which the shaft 28 passes, a first bearing 34 through which the shaft 28 passes, a second bearing 36 through which the shaft 28 passes, a first transducer 38 adjacent to the shaft 28 and positioned to measure force at a first location on the shaft 28, and a second transducer 40 adjacent to the shaft 28 and positioned to measure force at a second location on the shaft 28. The shaft 28 has threaded near a second end of the shaft 28. A hold down cone 42 has central bore with threads which cooperate with the threads on the second end of the shaft 28. Although the shaft 28 passes through the pinion gear 32, the pinion gear 32 is able to slide with respect to the shaft 28 so that the pinion gear 32 may rotate without rotating the shaft 28 and so that the shaft 28 may rotate without rotating the pinion gear 32. The clutch plate 33 is attached to the shaft 28 to allow the clutch plate 33 to slide axially along the length of the shaft 28, but so that when the clutch plate 33 is rotated the shaft 28 is rotated. When the clutch plate 33 is slid against the pinion gear 32, teeth on the clutch plate 33 mesh with teeth on the pinion gear 32 causing the clutch plate 33 and the pinion gear 32 to rotate together.

FIG. 3 is a plane view of a partial section taken along line 3—3 of FIG. 1. A pneumatic cylinder 70 has end caps 72,73 and side walls 75 and is slidably mounted on guide rods 76 by guide bushings installed in bores in portions of end caps 72, 73 extending beyond cylinder side wall 75. Guide rods 76 constrain cylinder 70 to move only in the direction of its longitudinal axis which is positioned normal to the longitudinal axis of the shaft 20. Piston 80 divides pneumatic cylinder 70 into two piston chambers 84 and 86. A piston support rod 82 is attached to the piston 80 at a first end of the piston support rod 82 and passes through end cap 73 and is attached to the base cabinet 11 at a second end of the piston support rod 82. The draw bar 24 is connected between the bead breaker arm 13 and the pneumatic cylinder 70. Air ports 78 and 79 in end caps 72 and 73 respectively, allow high pressure air to be introduced to and bled from piston chambers 84 and 86 by a system of pneumatic valve tubes connected to a source of high pressure air. Such pneumatic power and control systems, which are controlled by a first foot pedal 44, are well understood by those knowledgeable in the art.

Rack 90 is attached to the end caps 72 and 73 by bolts 92 and 93 and is provided with gear teeth 94 which cooperatively engage teeth 95 of the pinion gear 32 which is mounted on the shaft 20. Thus a translational movement of cylinder 70 along its axis will result in a proportional rotational movement of the pinion gear 32 about its axis. Pneumatic valves and conduits connected to a source of high pressure air, such as is understood by those of the art, are utilized to introduce and vent high pressure air to and from chambers 84 and 86 to cause selective rotation of the pinion gear 32.

FIG. 4 is an electrical schematic of the preferred embodiment of the invention. The encoder 30 is electrically connected to a micro controller 60. The first transducer 38 is electrically connected to a first filter 64, which is electrically connected to the micro controller 60. The second transducer 40 is electrically connected to a second filter 63, which is electrically connected to the micro controller 60. A power source 71, a display 77 and input buttons 74 are also connected electrically connected to the micro controller 60.

In operation, a tire might first be changed. Using the tire changing and balancing apparatus, a wheel assembly 49 is first rolled into position between the bead breaker blade 22 and the breaker pad 26. In response to depression of the first foot pedal 44, the first piston chamber 84 is first vented while high pressure air is introduced into the second piston chamber 86 by a pneumatic valve power and control system. This causes the pneumatic cylinder 70 to move toward the bead breaker arm 13, forcing draw bar 24 to push the bead breaker arm 13 away from the base cabinet 11, moving the breaker blade 22 away from the breaker pad 26. A tire is placed between the breaker blade 22 and the breaker pad 26 and the first foot pedal 44 is again depressed. High pressure air is introduced into the first piston chamber 84 and the second piston chamber 86 is vented, causing the pneumatic cylinder 70 to move away from the beaker arm 13, which causes the breaker blade 22 to move towards the breaker pad 26 collapsing the tire carcass. Once the tire is collapsed, the first piston chamber 84 is vented and the second piston chamber 86 is pressurized to swing the breaker arm 13 outwardly away from the base cabinet 11 and allows the wheel and tire assembly to be removed from between the breaker blade 22 and the breaker pad 26.

The wheel assembly 49 is then mounted upon the shaft of the tire changing and balancing apparatus 10. This is accomplished by placing the second end of the shaft 20 through the hub of the wheel. The second end of the shaft 20 is then placed through the central bore of the hold down cone 42, and the hold down cone 42 is tightened to hold the wheel in place.

Once the wheel assembly 49 is mounted, the mount and demount arm is positioned so that mount and demount head is properly engaged with the rim and tire of the wheel assembly 49. When the first foot pedal 44 is depressed in addition to venting the second piston chamber 86 and providing pressurized air to the first piston chamber 84 the first foot pedal 44 causes the clutch plate 33 to slide so that it engages the pinion gear 32. The movement of the pneumatic cylinder 70 causes the pinion gear 32 to rotate, which rotates the clutch plate 33 which rotates the shaft 20, thus rotating the wheel assembly 49 in a desired direction to allow the mount and demount head 19 to remove the tire. After the rack 90 has engaged the pinion gear 32 through an entire revolution of the wheel assembly 49, the pneumatic power and control system causes the first piston chamber 84 to vent providing the second piston chamber 86 with pressurized air, causing the pneumatic cylinder 70 to reversed direction. To prevent the wheel from rotating in a reverse direction, the clutch plate 33 is disengaged from the pinion gear 32 when the pneumatic cylinder 70 goes in the reversed direction.

After the tire is removed and the pneumatic cylinder 70 is reset, a new tire is placed on the wheel assembly 49 and the mount and demount head is positioned to engage the wheel assembly 49 rim and tire. When the first foot pedal 44 is depressed in addition to venting the second piston chamber 86 and providing pressurized air to the first piston chamber 84 the first foot pedal 44 causes the clutch plate 33 to slide so that it engages the pinion gear 32. The movement of the pneumatic cylinder 70 causes the pinion gear 32 to rotate, which rotates the clutch plate 33 which rotates the shaft 20, thus rotating the wheel assembly 49 in a desired direction to allow the mount and demount head 19 to mount the tire. After the rack 90 has engaged the pinion gear 32 through an entire revolution of the wheel assembly 49, the pneumatic power and control system causes the first piston chamber 84 to vent providing the second piston chamber 86 with pressurized air, causing the pneumatic cylinder 70 to reversed direction. To prevent the wheel from rotating in a reverse direction, the clutch plate 33 is disengaged from the pinion gear 32 when the pneumatic cylinder 70 goes in the reversed direction. The second foot pedal 45 is depressed to fill the tire with air.

After the new tire is mounted, the wheel assembly 49 may be balanced. A hand crank speed nut 51 with a threaded central bore is placed so that the second end of the shaft 20 passes through the central bore. The hand crank speed nut 51 is then tightened. Wheel parameters are entered into the micro controller through the input buttons 74, which is powered by the power source 71. The hand crank speed nut 51 is used to spin the wheel assembly by hand. The first transducer 38 measures the force on the shaft 20 at the first location and passes a signal through the first filter 64 to the micro controller 60. The second transducer 40 measures the force on the shaft 20 at the second location and passes a signal through the second filter 63 to the micro controller 60. The encoder 30 measures the angular position of the wheel assembly 49 and passes a signal to the micro controller 60. The micro controller processes the information and indicates to the operator through the display 77 which weights should be placed where on the wheel assembly 49.

Other types of tire changing devices may by used. A further description of tire changing machines are described in U.S. Pat. No. 5,088,539 incorporated by reference. Other types of wheel balancers may be used. In addition to being hand spun, the wheel balancing aspect may employ a permanent motor or a frictional motor against the tire to spin the wheel to allow balancing. One type of wheel balancer is described in U.S. Pat. No. 4,285,240 incorporated by reference. When spun by hand, the balancing electronics must be able to balance a wheel assembly rotated at speeds less than 200 rpm.

While preferred embodiment of the present invention has been shown and described herein, it will be appreciated that various changes and modifications may be made therein without departing from the spirit of the invention as defined by the scope of the appended claims.

What is claimed is:

1. An apparatus for changing and balancing a tire on a wheel assembly with a central hole, comprising:
   a mounting shaft with a central axis along the length of the mounting shaft;
   an encoder for measuring the angular rotation of the mounting shaft around the central axis;
   a first transducer mounted adjacent to a first location on the mounting shaft;
   a second transducer mounted adjacent to a second location on the mounting shaft;
   means for collapsing the tire on the wheel assembly;
   means for mounting the wheel assembly on the mounting shaft, wherein the mounting shaft passes through the central hole of the wheel assembly;
   means for demounting a tire from the wheel assembly and mounting a tire on the wheel assembly while the wheel assembly is mounted on the mounting shaft;
   means for spinning the wheel assembly while mounted on the mounting shaft; and
   means for receiving signals from the encoder, the first transducer, and the second transducer and computing the balance of the wheel assembly.

2. An apparatus, as claimed in claim 1, wherein the mounting shaft is a vertical shaft, further comprising, a means for engaging and disengaging the shaft from the means for spinning the wheel.

3. An apparatus, as claimed in claim 2, further comprising, a base cabinet which supports the vertical shaft, the means for spinning the wheel assembly, and the means for collapsing the tire.

4. An apparatus, as claimed in claim 3, wherein the means for demounting a tire, comprises:
   a tower with a first end attached to the base cabinet;
   a mount and demount arm with a first end attached to the a second end of the tower; and
   a mount and demount head attached to a second end of the mount and demount arm.

5. An apparatus, as claimed in claim 4, further comprising input buttons and digital readout displays electrically connected to the means for receiving signals.

6. An apparatus, as claimed in claim 1, further comprising means for hand spinning the wheel assembly, wherein the means for receiving signals is able to compute the balance of the wheel assembly when the wheel assembly is spun at speeds less than 200 rpm.

7. A method of changing and balancing a tire on a wheel assembly, comprising the steps of:
  placing the tire on the wheel assembly between a breaker blade and a breaker pad;
  moving the breaker blade towards the breaker pad, thus collapsing the tire;
  mounting the wheel assembly on a shaft, by placing the shaft through a hole in the wheel assembly;
  securing the wheel assembly on the shaft;
  placing a mounting and demounting head adjacent to the wheel assembly;
  applying a force from the mounting and demounting head against the tire on the wheel assembly to free the tire from the wheel assembly;
  removing the tire from the wheel assembly;
  placing a second tire adjacent to the wheel assembly;
  applying a force from the mounting and demounting head to mount the second tire on the wheel assembly;
  spinning the wheel assembly on the shaft; and
  calculating the balance of the wheel assembly as the wheel assembly spins on the shaft.

8. A method, as claimed in claim 7, wherein the step of calculating the balance of the wheel assembly, comprises the steps of:
  measuring the forces on the shaft; and
  using the measured forces on the shaft to calculate the balance of the wheel assembly.

9. A method of changing and balancing a tire on a wheel assembly, comprising the steps of:
  placing the tire on the wheel assembly between a breaker blade and a breaker pad;
  moving the breaker blade towards the breaker pad, thus collapsing the tire;
  mounting the wheel assembly on a shaft, by placing the shaft through a hole in the wheel assembly;
  securing the wheel assembly on the shaft;
  placing a mounting and demounting head adjacent to the wheel assembly;
  applying a force from the mounting and demounting head against the tire on the wheel assembly to free the tire from the wheel assembly;
  removing the tire from the wheel assembly;
  placing a second tire adjacent to the wheel assembly;
  applying a force from the mounting and demounting head to mount the second tire on the wheel assembly;
  spinning the wheel assembly on the shaft; and
  calculating the balance of the wheel assembly as the wheel assembly spins on the shaft, wherein the step of calculating the balance of the wheel assembly, comprises the steps of:
  measuring the forces on the shaft;
  using the measured forces on the shaft to calculate the balance of the wheel assembly,
  measuring the angular rotation of the shaft; and
  using the angular rotation of the shaft to calculate the balance of the wheel assembly.

* * * * *